United States Patent [19]
Wharton

[11] 4,399,329
[45] Aug. 16, 1983

[54] STEREOPHONIC BILINGUAL SIGNAL PROCESSOR

[75] Inventor: James H. Wharton, Indianapolis, Ind.

[73] Assignee: RCA Corporation, New York, N.Y.

[21] Appl. No.: 325,044

[22] Filed: Nov. 25, 1981

[51] Int. Cl.³ .......................... H04N 5/60; H04H 5/00
[52] U.S. Cl. ............................ 179/1 GB; 179/1 GM; 358/144; 358/341
[58] Field of Search ............. 179/1 GB, 1 GC, 1 GD, 179/1 GN, 1 GM, 1 GQ; 358/143, 144, 341, 343, 344

[56] References Cited

U.S. PATENT DOCUMENTS

| | | | |
|---|---|---|---|
| 3,795,764 | 3/1974 | Altmann | 179/1 GB X |
| 3,969,756 | 7/1976 | Palmer et al. | 358/144 X |
| 4,016,366 | 4/1977 | Kurata | 179/1 GD |
| 4,236,041 | 11/1980 | Thomas | 179/1 GN |
| 4,272,788 | 6/1981 | Ogita | 179/1 GC X |
| 4,302,837 | 11/1981 | Tanaka et al. | 179/1 GB X |

FOREIGN PATENT DOCUMENTS 2223432  12/1973  Fed. Rep. of Germany ... 179/1 GB

OTHER PUBLICATIONS

"Multichannel Sound System for TV Broad Casting", Numaguchi et al., IEEE Consumer Electronics, 8/1981, pp. 366–370.
Data Sheet Type TA 7633p Integrated Circuit.

*Primary Examiner*—R. J. Hickey
*Attorney, Agent, or Firm*—E. M. Whitacre; J. S. Tripoli; R. G. Coalter

[57] ABSTRACT

The format of two audio input signals, which may be of either matrixed form wherein each signal comprises two common components or of unmatrixed form wherein each signal comprises a respective independent component, is determined by applying the signals to a first network circuit which linearly combines the signals to produce a resultant audio output signal exhibiting a null condition when the input signals are of matrixed form and a non-null condition when the input signals are of unmatrixed form. A null detector responsive to the resultant signal supplies a control signal to a second decoder matrix which decodes the matrixed signals to independent form and couples the decoded signals to respective first and second output terminals when the null condition is detected and which couples the unmatrixed input signals to respective ones of the first and second output terminals when the non-null condition is detected.

10 Claims, 2 Drawing Figures

STEREOPHONIC BILINGUAL SIGNAL PROCESSOR

This invention relates to signal processing apparatus and particularly to apparatus for processing audio signals of matrixed two-channel form (e.g., stereophonic signals) or of unmatrixed two-channel form (e.g., bilingual signals).

Television systems are known in which a monaural audio signal is conveyed on a first FM carrier, stereophonic signals are conveyed in matrixed form with the sum signal (L+R) on the first carrier and the difference signal (L−R) on a second carrier and in which bilingual signals are conveyed in unmatrixed form with a "primary" language on the first FM carrier and a "secondary" language on the second FM carrier. Such a signal format is advantageous in that it is "backward compatible" with receiving or reproducing apparatus having only a signal FM demodulator for the first FM carrier such as, for example, monaural television receivers or monaural video disc players.

For such apparatus, the signal FM demodulator will reproduce the complete stereo signal (L+R), the complete monaural signal and the primary language of the bilingual signal. The reason for conveying the bilingual signal in unmatrixed form (i.e., each language on a separate carrier) is two-fold. First, if matrixed, the signal could not be separated by a TV receiver or a video disc player having only a single sound demodulator. Second, even if an additional demodulator and decoder matrix were added to the receiver or player, it is doubtful that the degree of channel separation obtainable by conventional decoders would be acceptable for purposes of separating two different languages (or other similarly unrelated audio signals).

A known decoder for monaural, matrixed two-channel and unmatrixed two-channel audio signals is the type TA-7633-P integrated circuit which is designed for use in television receivers. The circuit includes an AM detector for detecting a modulated pilot signal indicative of the presence of a stereo or bilingual signal and two further detectors responsive to the AM detector output signal for identifying whether the signal is of matrixed (stereo) or un-matrixed (bilingual) form. If the signal is matrixed form, a stereo indicator LED is illuminated and an audio matrix is placed in a stereo decode mode of operation for separating the left and right signals from the stereo sum (L+R) and difference (L−R) signals produced by respective demodulators. If the signals is of un-matrixed form, a bilingual indicator LED is illuminated and the audio signal matrix is placed in a bilingual mode of operation for coupling a selected one of the audio signals to the receiver output terminals. Detection of monaural signals, squelching of the second demodulator and control of the audio matrix for monaural reception is provided by sensing the absence of the stereo and bilingual identification signals.

A monaural, matrixed stereophonic, un-matrixed bilingual decoder particularly well suited for audio signal processing in a video disc player is described in the copending U.S. Patent Application of G. N. Mehrotra entitled "Video Disc Player for Monophonic, Stereophonic and Bilingual Records". The decoder includes muting circuitry and a switchable audio matrix circuit, the combination of which advantageously provides the functions of both noise suppression and player operating mode control. Signals for controlling the matrix and the muting circuitry are provided by a switch which may be user activated.

Summarizng to this point, in television receivers and video disc players of the general kind described above, the operating mode of the audio matrix circuitry differs for processing matrixed and un-matrixed signals. Since one may not know beforehand whether the audio signals are stereophonic or bilingual, it would be desirable to provide an indication to the user of the receiver or player of the type of audio signals being received or reproduced. In the aforementioned integrated circuit, this function is provided by three detectors which process a pilot tone that is modulated by identification signals.

One difficulty with the pilot tone identification technique of the prior art is that it is relatively complex and requires the use of frequency selective or tuned circuits to decode the tones. Such circuits are disadvantageous in that they may require initial adjustment and may be subject to drift due to environmental effects or aging of the components.

Another difficulty is that in some cases the mere presence of a pilot tone (whether or not it is also modulated) can create problems. In a video disc player, for example, spectrum limitations and cross modulation effects may make pilot tones unattractive for stereo-bilingual identification purposes.

One object of the invention is to eliminate the need for frequency selective circuits in apparatus for identifying different two-channel audio signal formats. Another object is to eliminate the need for all pilot tone processing in such apparatus.

In accordance with a first aspect of the invention, apparatus for processing first and second audio input signals of matrixed or unmatrixed form includes first means for linearly combining the input signals to provide a resultant audio signal exhibiting a null condition when the input signals are of matrixed form and a non-null condition when the input signals are of unmatrixed form. Second means detects the null and non-null conditions of the resultant audio signal to provide an indicator signal having a first condition indicative of the matrixed form of the input signals and a second condition indicative of the unmatrixed form of the input signals.

In accordance with a further aspect of the invention, third means separates common components of the input signals and couples the separated common components to respective audio output terminals in response to the first condition of the indicator signal. The third means couples the first audio input signal solely to one of the output terminals and couples the second audio input signal solely to the other output terminal in response to the second condition of the indicator signal.

Figure 1:
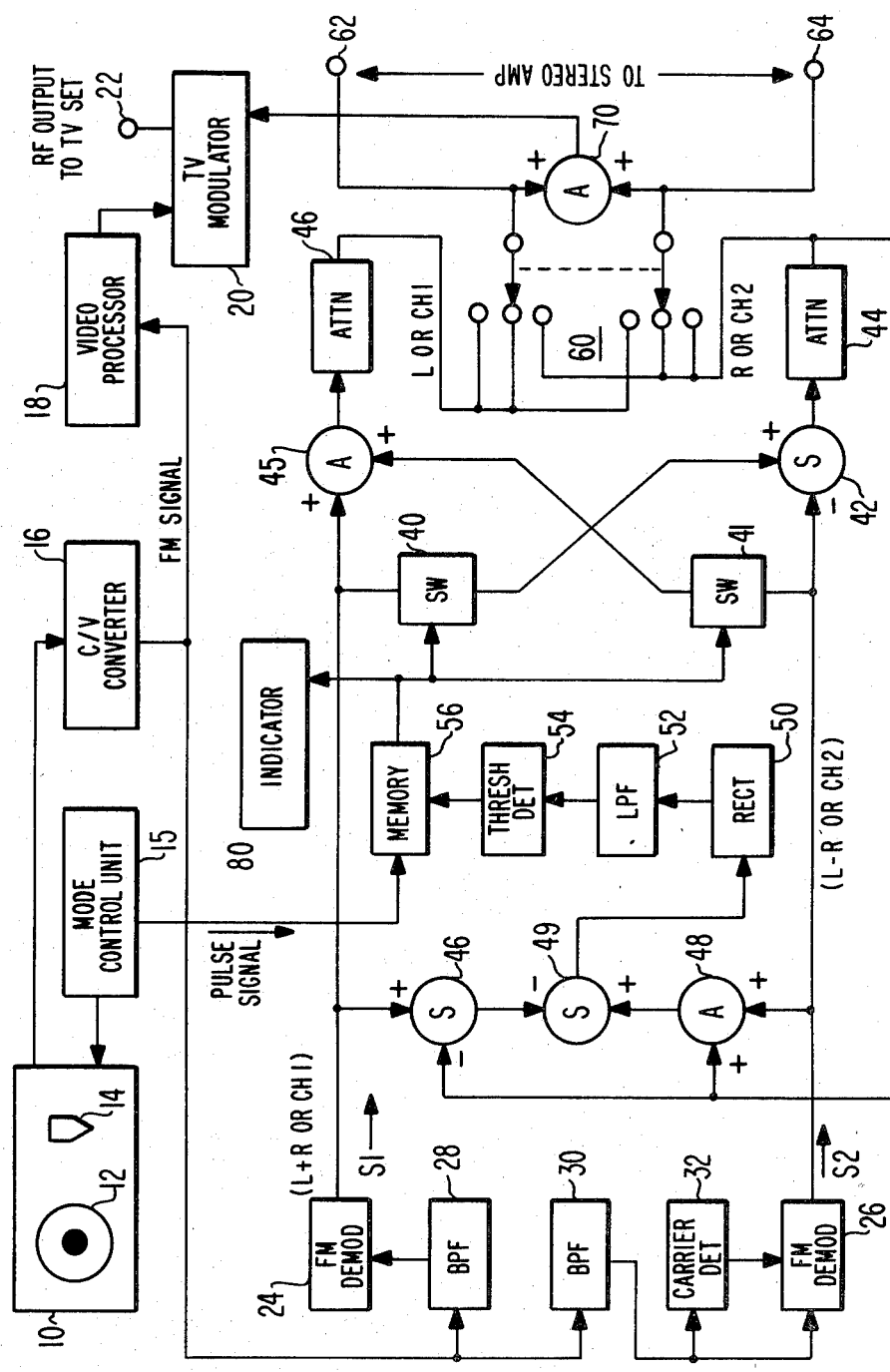
FIG. 1 is a block diagram of a video disc player embodying the invention.

The video disc player of FIG. 1 includes a signal recovery unit 10 having a turntable for rotating a video disc record 12 and a pickup transducer 14 for recovering frequency modulated audio and video signals from the record. A mode control unit 15 is coupled to recovery unit 16 and includes logic circuitry responsive to user activated switches for controlling the tracking of transducer 14 in various player operating modes (e.g., pause, play, scan forward, scan reverse, etc.). Unit 15 may be implemented with random logic but preferably is of the microprocessor based kind as described, for example, in U.S. patent application Ser. Nos. 084,465; 084,393; 084,392; 084,386; and 084,396, all filed Oct. 12, 1979 and assigned to the assignee of the present invention.

Illustratively, it will be assumed that the player is intended for use with records of the type in which information is stored in the form of topological variations and recovered by sensing capacitance variations between pickup transducer 14 and record 12. (Alternatively, the record and transducer may be of the optical type.) The output of transducer 14 is coupled to the input of a pickup capacitance-to-voltage converter 16 responsive to capacitance variations between a stylus in transducer 14 and the record being played for producing an FM output signal voltage representative of the recorded information. Such records and suitable circuits for implementing the capacitance-to-voltage (C-V) conversion function of converter 16 are well known. See, for example, U.S. Pat. No. 3,783,196 entitled "High Density Capacitance Information Records and Playback Apparatus Therefore" which issued to T. O. Stanley on Jan. 1, 1974; U.S. Pat. No. 3,972,064 entitled "Apparatus and Methods for Playback of Color Pictures/Sound Records" which issued to E. O. Keizer on July 27, 1976 and U.S. Pat. No. 3,711,641 entitled "Velocity Adjusting System" which issued to R. C. Palmer on Jan. 16, 1973.

The output of converter 16 is applied to the input of a video processor 18 which includes a demodulator (not shown) for demodulating the video portion of the FM signal to baseband. Illustratively, the demodulator may be of the pulse counting type as described in U.S. Pat. No. 4,038,686 or of the phase lock loop type as described in U.S. Pat. No. 4,203,134.

It is preferable, in video disc player applications, that the video signal be recorded on disc 12 in the "buried subcarrier" (BSC) format proposed by D. H. Pritchard in U.S. Pat. No. 3,872,498. In the BSC format, chrominance information is represented by a color subcarrier of the general form employed in the well-known NTSC format. However, the chrominance component in the BSC format is not located in the high end of the luminance signal band, as in NTSC, but rather is "buried" in a mid-portion of the video band. Accordingly, video processor 18 includes conversion circuitry for translating the recovered chrominance signal component to the high end of the video band. Pritchard describes a suitable converter. Another suitable converter in which errors in the disc-transducer relative velocity and errors in the chrominance signal frequency are corrected by means of a color burst locked two loop servo system is described in U.S. Pat. No. 3,965,482 of T. W. Burrus.

The baseband video signal produced by video processor 18 is applied to the video carrier modulation input terminal of a TV modulator 20 which has an output terminal 22 for connection to the antenna terminals of a conventional television receiver (not shown). The audio portion of the FM signal recovered from disc 12 is processed as will be described and applied to the baseband audio input terminal of TV modulator 20 which produces picture and sound carrier waves modulated on a selected TV channel for reception by the television receiver. An integrated circuit suitable for use as TV modulator 20 and which may be selectively operated to provide an RF output signal on channels 3 or 4, for example, is the model LM 1889N "TV Video Modulator" made by National Semiconductor Company, Inc.

Audio signals S1 and S2 are recovered from disc 12 in the video disc player by applying the output of capacitance-to-voltage converter 16 to a pair of FM demodulators 24 and 26 via respective band pass filters 28 and 30. Preferably, the sound carrier center frequency choices correspond to odd multiples of half the line frequency. The stereo sum signal (L+R) or a monaural signal or a primary language bilingual signal (CH1) is conveyed by the lower frequency carrier. The stereo difference signal (L−R) or a secondary language signal (CH2) is conveyed by the higher frequency carrier as proposed in the U.S. patent application of G. N. Mehrotra entitled "Video Disc Player for Monophonic, Stereophonic and Bilingual Records", Ser. No. 248,776 filed Mar. 30, 1981. Illustratively, for NTSC standard video disc players, filters 28 and 30 may have center frequencies of about 715 KHz and 905 KHz, respectively, and bandwidths somewhat wider than the sound carrier peak deviation so as to ensure passage of first and second order sideband components of the modulated sound carriers. A carrier detector 32 is coupled to filter 30 and demodulator 26 for squelching the S2 audio signal (L−R or CH2) when monophonic records are being played so as to prevent noise which may be generated by demodulator 16 in the absence of the higher frequency carrier (905 KHz) from reaching the remainder of the audio processing circuitry.

The remaining elements of the video disc player comprise a linear signal combiner that produces a null audio signal when matrixed stereo records are played and a non-null audio signal otherwise. An audio null detector provides an indicator signal which indentifies the matrixed/non-matrixed character of the audio signals S1 and S2; provides a visual indication to the user of the player and controls a dual mode audio decoder matrix that processes the audio signals in one of two ways for application to the TV modulator and to provide outputs to a stereo amplifier.

In more detail, the baseband audio signal S1 is applied via a switch 40 (assumed closed) to one input of a subtractor 42 in the dual mode audio decoder matrix which receives the signal S2 at its other input and provides a difference signal S1−S2 at its output. Assuming the signal S1 is a matrixed stereo sum signal (L+R) and signal S2 is the difference signal (L−R), the output of the subtractor will be L+R−(L−R) or 2R. This signal is attenuated by a 6 dB attenuator 44 to supply a signal R to the inputs of a subtractor 46 and an adder 48 which receive, respectively, the signals S1 and S2. Subtractor 46 subtracts the signal R from S1 (L+R) to thereby decode the left channel signal L from signal S1. Adder 48 adds the signal R to the signal S2 (L−R) to thereby decode the signal L from signal S2. The signal L thus derived from S1 and the signal L derived from S2 are then applied to a further subtractor 49 thereby producing an output signal S3 which will be a null signal if, as assumed, the signals S1 and S2 both include the common component L (i.e., the left stereo signal).

Conversely, if the signals S1 and S2 are not of matrixed form (L+R) and L−R, respectively) but rather is of unmatrixed form (i.e., S1 equals a primary language or a monophonic signal CH1 and S2 equals a secondary language CH2) then no cancellation of audio signals can take place in subtractor 49 since there is no common component present in such unmatrixed signals. Accordingly, for unmatrixed signals, the audio output S3 will not be a null signal but instead will have some finite value when either of the unmatrixed or independent audio signals S1 or S2 are present.

The audio signal S3 is applied to a cascade connection of a rectifier 50, a low pass filter 52 and a threshold detector 54 for detecting the null and non-null conditions of signal S3. Rectifier 50 converts S3 to direct current, filter 52 smooths the rectifier output and rejects noise which may accompany S3. Threshold detector 54 provides further noise rejection by sensing whether the rectified and smoothed signal S3 is above or below a minimum value. For best results, it is preferable that the time constant of filter 52 be substantially longer than the period of the lowest frequency component of signals S1 and S2 (e.g., less than a few Hz) and that the threshold is of a value greater than the level of any noise which may accompany the audio signals S1 and S2.

The output of detector 54 is applied to the SET input terminal (S) of a memory unit (e.g., an R-S flip-flop) having a RESET input terminal (R) coupled to receive a "pause" indicating signal from control unit 15. When the player is in the "pause" operating mode memory unit 56 is placed in a reset condition, thereby providing a "high" output signal to switch 40 and to a further switch 41 which maintains the switches (e.g., transmission gates or a relay) in a closed condition. Switch 40 couples S1 to subtractor 42 as previously explained and switch 41 couples S2 to an adder 45 which adds S1 and S2 to produce the left channel output signal L when S1 and S2 are of matrixed stereo form. Since the sum of S1 and S2 is actually 2L the output of adder 45 is attenuated by 6 dB by means of an attenuator 46 coupled to the output of adder 45 whereby, for stereo signals, the outputs of attenuators 44 and 46 will be of comparable levels on the average thereby maintaining proper stereo balance.

Assume now that the player is placed in a "play" operating mode. Control unit 15 will remove the "pause" signal from memory unit 56. If the record 12 being played is a matrixed stereo record, subtractor 49 will produce a null audio signal as previoulsy explained and memory unit 56 will remain in its RESET condition, thereby maintaining switches 40 and 41 in a closed condition and the L−R and L+R stereo signals will be decoded by adder 45 and subtractor 42 to provide the signal R at the output of attenuator 44 and the signal L at the output of attenuator 46. A user activated two pole three position switch 60 (set in its center position, as shown) couples the left (L) and right (R) decoded stereo signals to respective ones of two output terminals 62 and 64 for connection to a stereo amplifier (not shown). An adder 70 coupled to terminals 62 and 64 combines the signals L and R and applies the resultant sum signal to the sound carrier modulation input of TV modulator 20. The user may thus listen to the recovered audio signals in stereophonic form on his stereo system or he may listen to the combined (monophonic) signals on his television receiver. An indicator 80 coupled to the output of memory unit 56 may be used to inform the user that the recovered signals are of stereophonic form. The indicator may be, illustratively, a lamp or a light emitting diode, which responds to the output signal condition of memory 56.

Assume now that the record 12 is either a monophonic record or a bilingual record recorded in unmatrixed form. In this case, there will be no common component in the signals S1 and S2, cancellation will not occur at the output of subtractor 49 and threshold detector 54 will supply a SET signal to memory unit 56, thereby opening switches 40 and 41. In this case, adder 45 will couple the signal S1 (i.e., CH1 or the primary language) to terminal 62 and subtractor 42 will couple signal S2 (i.e., CH2 or the secondary language) to terminal 64. There are two options to listen to the desired one of the two language signals S1 and S2. First, the user may operate the mode control switch found on many stereo amplifiers to select one of the two signals available at terminals 62 and 64. Alternatively, the user may place switch 70 in the uppermost position to feed the signals S1 to both of terminals 62 and 64 (and to the TV modulator). Or, the user may place switch 70 in its lowermost position to feed the signal S2 to terminals 62 and 64 and to the TV modulator.

If now the user again places the player in the "pause" operating mode, memory unit 56 will be reset, thereby closing switches 40 and 41 and placing the audio processor in a condition to decode stereo signals when play is resumed. If a null condition is not detected the dual mode decoder matrix (40, 41, 42, 44, 45, and 46) will then automatically change from its stereo decode mode to its bilingual coupling mode as previously explained.

If desired one may omit memory unit 56 from the audio processor. However, the inclusion of the memory unit has been found advantageous in that having once been set it will remain set until play is stopped, thereby eliminating the possibility of erratic operation of switches 40 and 41 which might occur due to noise, dropouts or other anomalies of the recovered signals S1 and S2.

Figure 2:
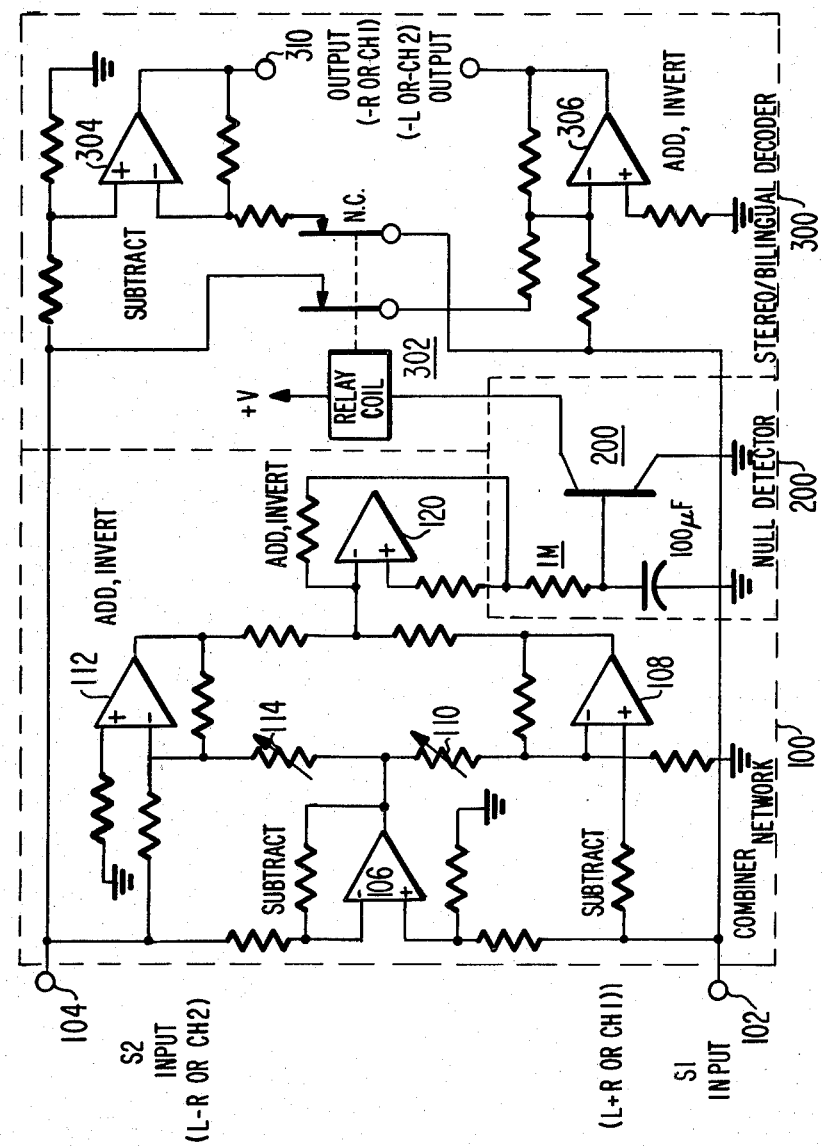
FIG. 2 is a circuit diagram of a stereo-bilingual signal processor embodying the invention.

A further modification to the player which may be made is that the signals S1 and S2 may be combined in a separate subtractor and attenuator to derive the common signal (R) for application to adder 48 and subtractor 46, rather than taking the common signal from the output of attenuator 44. Although this does add two additional elements to the stereo-bilingual identifier portion of the processor, it renders the format identification process completely independent of the condition (open or closed) of switches 40 and 41. This form of processing is shown in the specific circuit example of FIG. 2.

For convenience of illustration and explanation, the audio processor of FIG. 3 is divided by dashed lines into three principal sections, namely, a combiner network 100, a null detector 200 and a dual mode stereo-bilingual decoder 300. The processor has been constructed using type LM324 operational amplifiers. With the exception of the null detector components and two potentiometers in the combiner network, all resistor values are 10,000 Ohms.

Combiner network 100 comprises a pair of input terminals 102 and 104 for receiving the demodulated audio signals S1 and S2, respectively. As in the processor of FIG. 1, the input signals may be of either matrixed form ($S1=L+R$; $S2L-R$ wherein L and R may be stereo left and right channel signals, respectively) or of unmatrixed form (S1=CH1, a primary language; S3=CH2, a secondary language). The non-inverting input of an amplifier 106 is coupled via resistors to terminal 102 and ground, respectively, and the inverting input of the amplifier is coupled via resistors to terminal 104 and the amplifier output terminal respectively. All resistors are equal valued whereby amplifier 106 provides an output signal equal to 2R when S1 and S2 are of the matrixed form noted above.

The non-inverting input of another amplifier 108 is coupled via respective resistors to terminal 102 and ground and its inverting input terminal is coupled via a resistor to its output terminal and via a potentiometer 110 to the output of amplifier 106. The potentiometer 110 is adjusted to a value of 20,000 Ohms (twice the value of the fixed resistors in the circuit) whereby the signal 2R is attentuated by 6 dB and subtracted from the signal S1 thereby producing an output signal equal to the L (left) component of S1 at the output of amplifier 108.

The non-inverting input of a further amplifier 112 is coupled to ground via a resistor and its inverting input terminal is coupled to terminal 104 and to its output via respective resistors. The signal 2R produced by amplifier 106 is applied to the inverting input of amplifier 112 via a potentiometer 114 adjusted to a value of 20,000 Ohms (also twice the value of the fixed resistors) whereby the signal 2R is attentuated by 6 dB and to the signal S2 (i.e., L−R for stereo) to provide a resultant added and inverted signal equal to the −L (left) component of signal S2 at the output of amplifier 108.

Summarizing to this point, amplifiers 106, 108, and 112, in combination, derive the left stereo channel component L from the signal S1, and the left stereo channel component L from the signal S2. The L signal produced by amplifier 112 is inverted (i.e., −L) while that produced by amplifier 108 is not inverted (+L). The remaining elements of combiner network 100 provide the function of adding the outputs of amplifiers 108 and 112 in equal proportions thereby producing a null output voltage ($L-L=0$) where the signals S1 and S2 are of matrixed stereophonic form (L+R and L−R, respectively). This cancellation effect is provided by means of amplifier 120 having a non-inverting input coupled to ground via a resistor and an inverting input coupled to its output and to the outputs of amplifiers 112 and 108 by respective equal valued resistors. If the signals S1 and S2 are not of matrixed form as assumed but instead are unmatrixed, indepedent signals such as CH1 and CH2 having no common component then signal cancellation will not take place and amplifier 120 will produce a non-nulled audio output signal. In practice, a complete null of the common components of matrixed stereophonic signals may not be achieved if the signals S1 and S2 include uncorrelated noise components. For this reason, it is highly desirable that the null and non-null conditions of output signal produced by amplifier 120 be detected by means of a null detector of the threshold type as in the example of FIG. 1 and low pass filtering of the signal is also desirable to prevent false detection of non-null conditions of the signal. These functions are provided in FIG. 2 by null detector 200.

Detector 200 comprises a common emitter connected NPN transistor having a base electrode coupled to the output of amplifier 120 by a relatively high valued resistor (1 Megohm) and coupled to ground via a relatively high valued capacitor (100 microFarads). The base-emitter junction of transistor 200 provides the functions of rectification and threshold detection and the resistance capacitance combination provides signal smoothing and noise reduction. Assuming transistor 200 to be a silicon transistor, turn-on will occur when the capacitor voltage reaches about 600 or 700 millivolts, this being indicative of a non-null condition of the output signal of amplifier 120. Transistor 200 controls a double pole normally closed relay 302 that controls the operating mode of a dual mode stereo/bilingual decoder 300 as will now be explained.

Decoder 300 comprises relay 302, two amplifiers 304 and 306 and eight equal valued resistors. The non-inverting input of amplifier 304 is coupled via respective resistors to terminal 104 and ground. The output of amplifier 304 is connected to the processor output terminal 310 and via a feedback resistor to its inverting input and thence via a series connection of a further resistor and one set of the relay 302 contacts to terminal 102. When the signals S1 and S2 are of matrixed stereo form, transistor 200 will be off, no current will flow through the relay coil, the relay contacts will be closed. Amplifier 304 will therefore subtract signal S1 from S2 thereby providing a right channel output signal (inverted, −R) at terminal 310. If, however, the signals S1 and S2 are of unmatrixed form, the non-null condition of the output of amplifier 120 will be detected, transistor 200 will turn on thereby opening the relay contacts. In this case, amplifier 304 will function as a voltage follower and couple terminal 104 to terminal 310 thereby providing a (non-inverted) CH1 (channel one) output signal at terminal 310.

Amplifier 306 decodes (and inverts) the left channel stereo component of signal S1 when relay 302 is de-energized and couples terminal 102 to terminal 312 (with signal inversion) when the relay is energized. It will be noted that both the right and the left stereo signals are inverted when the decoder is in the stereo mode. Accordingly, the phase relationship of the two stereo signals with respect to each other is preserved by the processor and so there is no need to rephase the stereo speakers used with the processor.

The aforementioned addition and inversion functions of amplifier 306 are provided by coupling its non-inverting input terminal to ground via a resistor and coupling its inverting input terminal to its output terminal and to the processor output terminal 312 via a feedback resistor. The inverting input terminal is also coupled to terminal 102 via a resistor and to terminal 102 via a series connection of a further resistor and a second set of normally closed contacts of relay 302. When the signals S1 and S2 are of matrixed form, transistor 200 is turned off and amplifier 306 adds and inverts the signals S1 and S2 to provide a decoded and inverted left channel stereo output signal at terminal 312. When the signals S1 and S2 are of unmatrixed form, transistor 200 turns on thereby activating relay 302 and decoupling amplifier 306 from terminal 104. In this case, amplifier 306 couples and inverts the signal S1 at terminal 102 to terminal 312.

What is claimed is:

1. Apparatus for processing first and second audio input signals of either a matrixed stereophonic form wherein each signal comprises first and second common components or of an unmatrixed form wherein each signal comprises a respective independent component, said apparatus comprising:

first means for linearly combining said audio input signals in predetermined proportions to provide a resultant audio signal exhibiting a null condition when said input signals are of said matrixed form and a non-null condition when said input signals are of said unmatrixed form; and second means for detecting said null and non-null conditions of said resultant audio signal and providing an indicator signal having a first condition indicative of said matrixed form of said input signals and a secod condition indicative of said unmatrixed form of said input signals.

2. Apparatus as recited in claim 1 further comprising:
third means responsive to said first condition of said indicator signal for separating said common components of said audio input signals and coupling the separated components to respective ones of first and second audio output terminals and responsive to said second condition of said indicator signal for coupling said first audio input signal to one of said audio output terminals and for coupling said second audio input signal to the other of said audio output terminals.

3. Apparatus as recited in claim 2 wherein said second means comprises:
bistable means having an output for providing said indicator signal;
null detector means responsive to said non-null condition of said resultant audio signal for placing said bistable means in a first stable state corresponding to said second condition of said indicator signal; and
circuit means for placing said bistable means in a second stable state corresponding to said first condition of said indicator signal.

4. Apparatus as recited in claim 2 wherein said second means comprises:
null detector means having a predetermined threshold voltage and a detection response time greater than the period of the lowest frequency component of either of said audio input signals.

5. Apparatus as recited in claim 1 wherein said first means comprises:
means for separating a corresponding common component from each of said input signals; and
means for combining the separating corresponding common components of each of said input signals in a sense to cancel each other to provide said resultant audio signal.

6. Apparatus as recited in claim 2 wherein said first means includes a first input terminal for receiving said first audio input signal, a second input terminal for receiving said second audio input signal and a third input terminal for receiving a further audio input signal and further comprising a circuit path coupled between a selected one of said audio output terminals of said third means for supplying said further audio input signal to said third input terminal of said first means.

7. Apparatus as recited in claim 1 further comprising:
video disc player means having a first demodulator means coupled to supply said first audio input signal to said first means, a second demodulator means coupled to supply said second audio input signal to said first means and a control means for controlling the operating mode of said player means, said control means having an output for providing a mode indicating signal;
memory means having two states;
means for applying said indicator signal produced by said second means and said mode indicating signal produced by said control means to said memory means for controlling the state thereof; and
utilization means coupled to an output of said memory means.

8. Apparatus as recited in claim 7 wherein said utilization means provides at least one visual indicator means for indicating said status of said memory means.

9. Apparatus as recited in claim 7 wherein said utilization means comprises decoder means responsive to a first state of said memory means for separating said common components of said audio input signals and coupling the separated components to respective ones of two audio output terminals and responsive to a second state of said memory means for coupling said first audio input signal to one of said two audio output terminals and for coupling said second audio input signal to the other of said two audio output terminals.

10. Apparatus for identifying the form of first and second audio input signals which may be either of a matrixed stereophonic form wherein each signal comprises first and second common components or of an unmatrixed form wherein each signal comprises a respective independent component, said apparatus comprising:
first means for combining said first and second signals to produce a third audio signal;
second means for combining said first and third audio signals to produce a fourth audio signal;
third means for combining said second and third audio signals to produce a fifth audio signal;
fourth means for combining said fourth and fifth audio signals to produce a resultant audio signal exhibiting a null condition when said first and second audio input signals are of said matrixed form and a non-null condition when said first and second audio input signals are of said unmatrixed form; and
fifth means for detecting said null and non-null conditions of said resultant audio signal and providing an indicator signal having a first condition indicative of said matrixed form of said input signals and a second condition indicative of said unmatrixed form of said input signals.

* * * * *